March 17, 1964 A. R. ZACAROLI 3,124,868

METHOD OF MAKING SEMICONDUCTOR DEVICES

Filed April 18, 1960

INVENTOR.
ALEXANDER R. ZACAROLI
BY Gray, Mase and Dunson, Attorneys

United States Patent Office 3,124,868 Patented Mar. 17, 1964

3,124,868

METHOD OF MAKING SEMICONDUCTOR DEVICES

Alexander R. Zacaroli, Columbus, Ohio, assignor, by mesne assignments, to Radio Frequency Laboratories, Inc., Boonton, N.J., a corporation of New Jersey Filed Apr. 18, 1960, Ser. No. 22,936
6 Claims. (Cl. 29—155.5)

This invention relates to the production of semiconductor elements. More particularly, it is concerned with a method of forming electrical low-resistance contacts on semiconductor elements.

Semiconductor elements are used in a variety of applications and a number of methods have been used to attach electrical contacts to semiconductor elements. With semiconductor elements that are very small or very thin, such as those used in Hall elements, particularly difficulties arise with conventional methods of attaching electrical contacts, particularly in obtaining a low-resistance contact and in placing the contact accurately at the location selected or desired on the semiconductor.

When electrons move in a conductor in a direction perpendicular to a magnetic field, they are deflected toward one side of the conductor (left or right depending upon the direction of the magnetic field) in a direction normal to the directions of both the initial electron velocity and the magnetic field. This deflection process continues until sufficient charge has accumulated at the sides of the conductor to establish a transverse electric field which opposes further deflection of charge carriers. The transverse potential difference thus created is called the Hall voltage and the phenomena causing it, the Hall effect. While this invention is not to be limited to Hall elements, this brief explanation of the Hall effect indicates a particular use for very thinly sliced semiconductors.

Placement of electrical contacts on the semiconductor is also an important consideration. For example, on a flat rectangular semiconductor, such as a Hall element, having input electrical contacts at the ends or short sides, it is desirable to have the electrical contacts at the long sides directly opposite each other so that there will be a zero potential between them in the absence of a magnetic field. If they are not placed properly (i.e., directly opposite each other), one of the side electrical contacts will be farther away from the input electrical contact than the other side electrical contact. In such a case, the electrical circuit from the input electrical contact to the farther of the side electrical contacts will have more resistance than the circuit from the input electrical contact to the closer of the side electrical contacts; thus there will be a potential difference between the side contacts.

In soldering electrical contacts to very thin semiconductor elements, many of the semiconductor materials erode away so that it is practically impossible to obtain semiconductor elements with consistent dimensions or similar electrical properties. Attaching electrical contacts to semiconductor elements with silver paint alone, results in "noisy" contacts which are pressure-sensitive and have large contact resistance. Pressure contacts also have large contact resistance and are unstable in resistance. Welding, or flash welding, is unsatisfactory since it is hard to align side contacts. In welding techniques, the elements may turn slightly or the metal may flash unevenly so that contact areas are unequal or uneven. All of these methods, especially welding, also require elaborate fixtures or jigs.

An important advantage of this invention is that it provides electrical contacts of low resistance that are accurately placed on the semiconductor. Another is that it provides a contact that may completely cover the end of a semiconductor, giving a uniform current density through the semiconductor.

Briefly described, a specific example of the method of this invention includes: milling grooves in the top and bottom of a bar of semiconductor material, placing solder in the grooves and along the sides of the bar that are parallel but not adjacent to the grooves, and then thinly slicing the bar in a plane perpendicular to the solder strip, leaving the solder in the desired areas of the finished element for attachment of the contacts.

Another example of the method of this invention includes electroplating the entire bar after the grooves are milled in the top and bottom, grinding or shaving the bar on the top and bottom to remove the electroplate material from these surfaces, leaving the material at the sides and in the grooves, and then slicing the elements in a plane perpendicular to the strips of electroplated area, to give a semiconductor wherein the leads can readily be attached to the desired plated areas.

This invention comprises a method of forming electrical low-resistance contacts on semiconductor elements, the preferred form of which is disclosed in the following description and attached drawings. Although the invention is shown and described in detail in connection with thin semiconductor elements, it is apparent that it is not limited thereto. Many of the significant features of this invention apply also to other types of semiconductors.

Figures 1, 2, 3, 4:
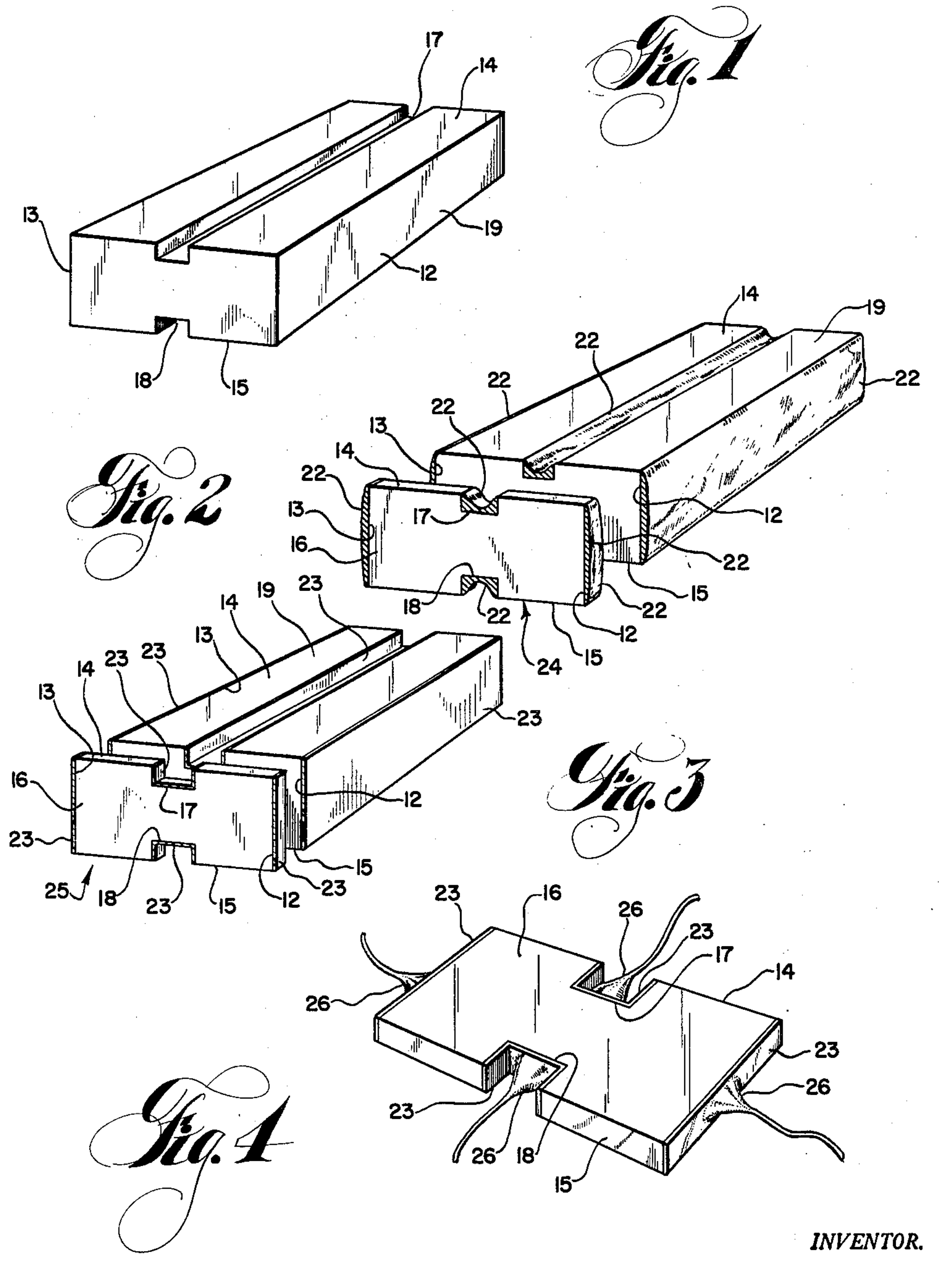
FIG. 1 is an enlarged perspective view of a block of semiconductor material with grooves milled in the top and bottom thereof.
FIG. 2 is an enlarged perspective view of the original blank of material, to certain areas of which solder or the like has been applied, from which components are formed and which has one slice taken off an end.
FIG. 3 is an enlarged perspective view of the original blank of material, plated and from which components are formed and which has one slice taken off an end.
FIG. 4 is an enlarged perspective view of a completed semiconductor with leads attached.

Referring to FIG. 1, a block of semiconductor material is first cut from a piece of stock semiconductor material. The stock is then ground or lapped to a predetermined height and width to establish the desired dimensions and to assure parallelism of the sides 12 and 13 and of the top 14 and bottom 15. A cross section or end 16 of the stock will usually be the largest surface of the semiconductors to be sliced from the stock after further preparation.

Grooves 17 and 18 are formed lengthwise across the centers of the top 14 and bottom 15, respectively, resulting in a bar 19 of semiconductor material shown in FIG. 1. Although there are a number of methods of forming the grooves 17 and 18 in the bar 19, one method is with a silicon carbide wheel with a low feed rate and with a glass slide cemented to the bar 19 so that the cuts are made through the glass. The glass slide prevents chipping at the edges of the grooves 17 and 18. The grooves 17 and 18 are registered accurately opposite each other so that when electrical contacts are later attached to thin slices of the bar 19 at the grooves 17 and 18, a transverse potential of zero will result in the absence of a magnetic field. When completely formed, the bar 19 has the relative dimensions shown in FIG. 1.

The sides 12 and 13 and grooves 17 and 18 are the areas where the contacts will eventually be applied. These areas are covered with a metal that will facilitate application of the contacts. FIG. 2 shows a bar 19 of semiconductor material that has been tinned on the sides 12 and 13 with a layer of solder 22 or similar material. The grooves 17 and 18 have also been partially filled with fillets of solder 22 or similar material. FIG. 3 shows a bar 19 of semiconductor material that has been plated with a metal 23.

In the preferred form of the invention, when using indium arsenide or indium antimonide, the most satisfactory plating material 23 is gold. In this part of the process, a bar 19, such as that of FIG. 1, is first cleaned in 200 proof alcohol, then in a hot solution of detergent, such as Tide for approximately 15 seconds, then in a hot solution of 10 percent, by volume, of sodium hydroxide for about 5 minutes and, finally, several rinses with distilled water. The bar 19 is placed immediately, while wet, in a standard cyanide gold-plating bath which completely plates the bar 19. The plating is done with a gold anode and the bar 19 as the cathode. Plating is carried out at a current density of approximately three milliamperes per square centimeter for about fifteen minutes. This procedure, while not necessarily assuring a metallurgical bond, results in uniform plating. Since the gold plate is desired only on the sides 12 and 13 and grooves 17 and 18, unwanted gold is removed from the other surfaces by a few strokes of an abrasive material. The result as indicated in FIG. 3, is a plated bar 19 with gold plate 23 in the grooves 17 and 18 and on the sides 12 and 13.

To provide a good electrical and mechanical bond between the gold 23 and the semiconductor material, the gold 23 is alloyed into the bar 19 by placing the plated bar on a hot plate having a surface temperature of about 210° C. for about 40 seconds.

The next step in fabrication of the semiconductor elements is cutting slices 24 or 25 from the bars as shown in FIGS. 2 and 3 respectively. The cuts are made in a direction perpendicular to the longitudinal axis of the bar 19 as shown in FIGS. 2 and 3.

In cutting semiconductors which are to be used as Hall elements, the slices 24 and 25 cut from the tinned or plated bars must be made very thin. Two materials well suited electrically for use in Hall elements are indium arsenide and indium antimonide, which are characterized by a low tensile strength and extreme brittleness. Consequently, cutting these materials may result in fracture of the slices 24 and 25 and chipping of the edges unless special precautions are taken.

The thin slices 24 and 25 that are cut from the semiconductor material of the bars 19 have a different orientation than the bar 19. The top 14 and bottom 15 of the bar 19 are the sides of the slices 24 and 25, the sides 12 and 13 of the bar 19 are the ends of the slices 24 and 25, and the end 16 of the bar 19 has become one of the faces of the slices 24 and 25. The grooves 17 and 18 of the bar 19 are more like notches in the sides of the slices 24 and 25.

Cutting very thin slices can be accomplished if the exposed face 16 of the slice is temporarily affixed to a rigid, flat supporting surface. This prevents vibration of the slice during cutting and subsequent fracture. Glass is an excellent stabilizing medium and cuts are made through a glass-semiconductor assembly (with a very thin silicon carbide wheel, for example), the glass eliminating the chipping of the semiconductor at the edges of the cut. After slicing, the elements have the appearance shown in FIGS. 2 and 3.

After the slices 24 and 25 are cut from the bars 19 they are lapped to the desired thickness. Lapping is done, of course, with a fine-grit Carborundum paper, or similar material, with the elements mounted so as to prevent chipping at the edges. Rounding off and chipping at the edges of the elements can be prevented by placing a suitable protective material around the edges, such as a thermoplastic cement. When the elements are lapped to the desired thickness, they are removed from their mounts and are in suitable condition for attachment of the contacts 26 shown in FIG. 4.

Assuming for purposes of explanation that the semiconductors sliced from the bars 19 are to be used as Hall elements, the following description of attaching the contacts refers, of course, to very thin fragile elements which necessitates a high degree of handling care. However, a similar procedure would be used for attaching contacts to larger semiconductors. The usual procedure is to mount the thin slices 24 and 25 on a suitable mounting surface such as a glass microscope slide. The contacts 26 are also mounted in place on the glass in contact with the plated surfaces 12 and 13, and in the plated grooves 17 and 18, or the semiconductors may be placed on a printed circuit that contacts these plated areas. Under a microscope, air-drying silver paint is applied to the plated areas and ends of the contacts, being careful not to get paint on top of the elements or on the unplated edges. The paint should not be applied too thickly as this will cause the paint to pull away from the plated area when it dries. The applicator used for applying the silver paint may consist of a very small loop of very fine stainless steel wire which is held in a suitable device such as a pin vise. For best results the applicator is dipped in acetone and wiped with a lint-free tissue each time it is dipped into the silver paint. The glass slide with the semiconductor mounted thereon is placed in an oven at about 50° C. for approximately one hour to allow the silver paint to harden.

It will be understood, of course, that, while the forms of the invention herein shown and described, constitute preferred embodiments, it is not intended to illustrate all possible forms of the invention. It will also be understood that the words used are words of description rather than words of limitation and that various changes may be made without departing from the spirit and scope of the invention herein disclosed.

What is claimed is:

1. A method of forming electrical contacts on semiconductor elements comprising: forming a bar of semiconductor material; forming a pair of opposed, parallel, longitudinal grooves in the said bar; forming a coating of electrically-conductive metal metallurgically bonded to the walls defining said grooves; slicing the bar in a plane perpendicular to said grooves to form a thin semiconductor element; and securing electrical contacts to the coating of conducting metal in the grooves of said element in a manner to establish electrical continuity therebetween.

2. A method of forming low electrical resistance contacts on semiconductor elements comprising: forming a bar of semiconductor material having two pairs of opposed flat sides, said bar having a cross-section of the desired size of the semiconductor element; cutting a groove in each of a pair of said flat sides parallel to the long axis of the bar; forming a coating of low electrical resistance metal metallurgically bonded to the walls defining the grooves; slicing the bar in a plane perpendicular to said long axis of the bar to form a thin semiconductor element; and securing electrical contacts to the coating of metal in the grooves of said element in a manner to establish electrical continuity therebetween.

3. A method of forming low electrical resistance contacts on semiconductor elements comprising: forming a bar of semiconductor material having two pairs of opposed parallel, flat sides, said bar having a cross-section of the desired size of the semiconductor element; cutting a groove in each of one pair of flat sides of the bar and parallel to the long axis of the bar; forming a coating of low electrical resistance metal metallurgically bonded to the groove walls and to each of the other pair of flat sides of the bar; slicing the bar in a plane perpendicular to the long axis to form a thin semiconductor element; and securing individual electrical contacts to the metal coatings in the grooves and on the ungrooved sides of the element to establish electrical continuity between each of the contacts and the associated metal coating.

4. A method of forming low electrical resistance contacts on semiconductor elements comprising: forming a bar of semiconductor material having two pairs of opposed, parallel, flat sides, said bar having a cross-section of the desired size of the semiconductor element; forming a groove in each of one pair of flat sides of the bar and parallel to the long axis of the bar; forming a coating of low electrical resistance metal metallurgically bonded to the groove walls and to each of the other pair of flat sides of the bar; slicing the bar in a plane perpendicular to the long axis to form a thin semiconductor element; placing individual electrical contacts in engagement with the coatings of metal in the grooves and on the ungrooved sides of the element; applying a metallic paint to the contacts and the associated metal coatings; and heating the assembly to harden the metallic paint.

5. A method of forming low electrical resistance contacts on semiconductor elements comprising: forming a bar of semiconductor material with two pairs of opposed, parallel, flat sides; forming a groove in each of one pair of flat sides of the bar and parallel to the long axis of the bar; electroplating said bar with gold; removing the gold coating from the said one pair of flat sides of the bar leaving a gold coating in the grooves and on the other pair of flat sides of the bar; heating the bar to alloy the gold and the semiconductor material; slicing the bar in a plane perpendicular to said long axis to form a thin semiconductor element; placing individual electrical contacts in engagement with the gold coatings in the grooves and ungrooved sides of the element; applying a metallic paint to the electrical contacts and the associated gold coatings; and heating the assembly to harden the metallic paint.

6. A method of forming low electrical resistance contacts on semiconductor elements comprising: forming a bar of semiconductor material having two pairs of opposed, parallel, flat sides; forming a groove in the bar parallel to the long axis of and along the midline on each of one pair of flat surfaces; electroplating the bar with gold; abrasively removing the gold from the said one pair of flat surfaces leaving gold coatings in the said grooves and on the ungrooved sides of the bar; heating the bar to alloy the gold coatings with the semiconductor material; slicing the bar in a plane perpendicular to said long axis to form a thin semiconductor element; placing the element on a smooth supporting surface; placing individual electrical contacts in engagement with the gold coatings in the grooves and on the ungrooved sides of the element; applying a metallic paint to proximate portions of the contacts and the associated gold coatings; and heating the said supporting surface to harden the metallic paint.

References Cited in the file of this patent

UNITED STATES PATENTS

| | | |
|---|---|---|
| 1,378,501 | Wall | May 17, 1921 |
| 2,297,488 | Luderitz | Sept. 29, 1942 |
| 2,865,082 | Gates | Dec. 23, 1958 |
| 2,898,528 | Patalong | Aug. 4, 1959 |
| 2,916,806 | Pudvin | Dec. 15, 1959 |
| 2,944,321 | Westberg | July 12, 1960 |
| 2,967,344 | Mueller | Jan. 10, 1961 |
| 2,996,800 | Holly | Aug. 22, 1961 |